INVENTOR
Clarence Johnson
By Strauch, Nolan & Diggins
Attorneys

INVENTOR
Clarence Johnson
By Strauch, Nolan & Diggins
Attorneys

Patented Oct. 19, 1954

2,691,962

UNITED STATES PATENT OFFICE 2,691,962

ELECTRICAL CONTROL CIRCUIT FOR HYDROPNEUMATIC POWER MECHANISMS

Clarence Johnson, South Euclid, Ohio, assignor to Rockwell Manufacturing Company, Pittsburgh, Pa., a corporation of Pennsylvania Application January 9, 1950, Serial No. 137,605

8 Claims. (Cl. 121—45)

The present invention relates to switch mechanisms and control circuits and has particular reference to switch mechanisms and control circuits for hydro-pneumatic power mechanisms.

The novel switch mechanism and control circuits embodied herein are provided for the control of hydro-pneumatic power mechanisms such as those disclosed in my co-pending application, Serial No. 133,922, filed December 19, 1949, embodying power feed mechanisms adapted for use in the operation of drill presses and other feeds. In the present embodiment there is provided an improved switch mechanism and control circuit in which recycling of the power feed mechanisms may be controlled manually, automatically in response to dial feed or other indexing mechanisms, or automatically solely in response to the return of the feed mechanism to its normal position. The switch mechanism is actuated in one direction under control of the hydraulic medium and in the other direction by positive mechanical action in such a manner that recycling can only occur when the working piston of the power mechanism is in its normal or at-rest position. This results in a positive and extremely accurate control of the recycling action. Because of the versatility of the switch mechanism and control circuits embodied herein they may be used with equally high efficiency in either manual or automatic operation, there is uniformity in the manufacture in the basic switch and circuit structures for either type of operation, and a minimum of production time is lost in changing from one type of operation to the other. It has also been found that because of the positive control incident to the use of the novel switch mechanism and control circuits of this invention there is a substantial reduction in wear and breakage on expensive tools.

With these and other considerations in view it is an important object of this invention to provide a switch mechanism actuated by positive mechanical action on its one side and by oil pressure on its other side.

Another object resides in the provision of a switch mechanism with combined mechanical and hydraulic action for use in connection with hydro-pneumatic power mechanisms.

A further object resides in the provision of a novel combination of switch mechanism and control circuit providing positive cycling action in hydro-pneumatic power feed mechanisms.

A still further object resides in the provision of a switch mechanism and control circuits which result in a material saving in tool life and production time in hydro-pneumatic power feed mechanisms.

Another object resides in the provision of a switch mechanism and control circuit for use in hydro-pneumatic power feed mechanisms that may be manually operated or fully automatic.

A further object resides in the provision of a switch mechanism for use in hydro-pneumatic power feed mechanisms that is of low cost, easily fabricated and efficient in operation.

Other objects and advantages will be apparent from the following description in conjunction with the accompanying drawings and from the appended claims.

The accompanying drawings, in which like reference numerals are used to designate similar parts throughout, illustrate a preferred embodiment for the purpose of disclosing the invention. The drawings, however, are not to be taken in a limiting or restrictive sense, it being apparent to those skilled in the art that various changes in the illustrated construction may be resorted to without in any way exceeding the scope of the invention.

In the drawings:

Fig. 1 illustrates the system at the end of a retract stroke;

Fig. 7 is a schematic diagram illustrating another modified arrangement for automatic recycling.

Figure 1:
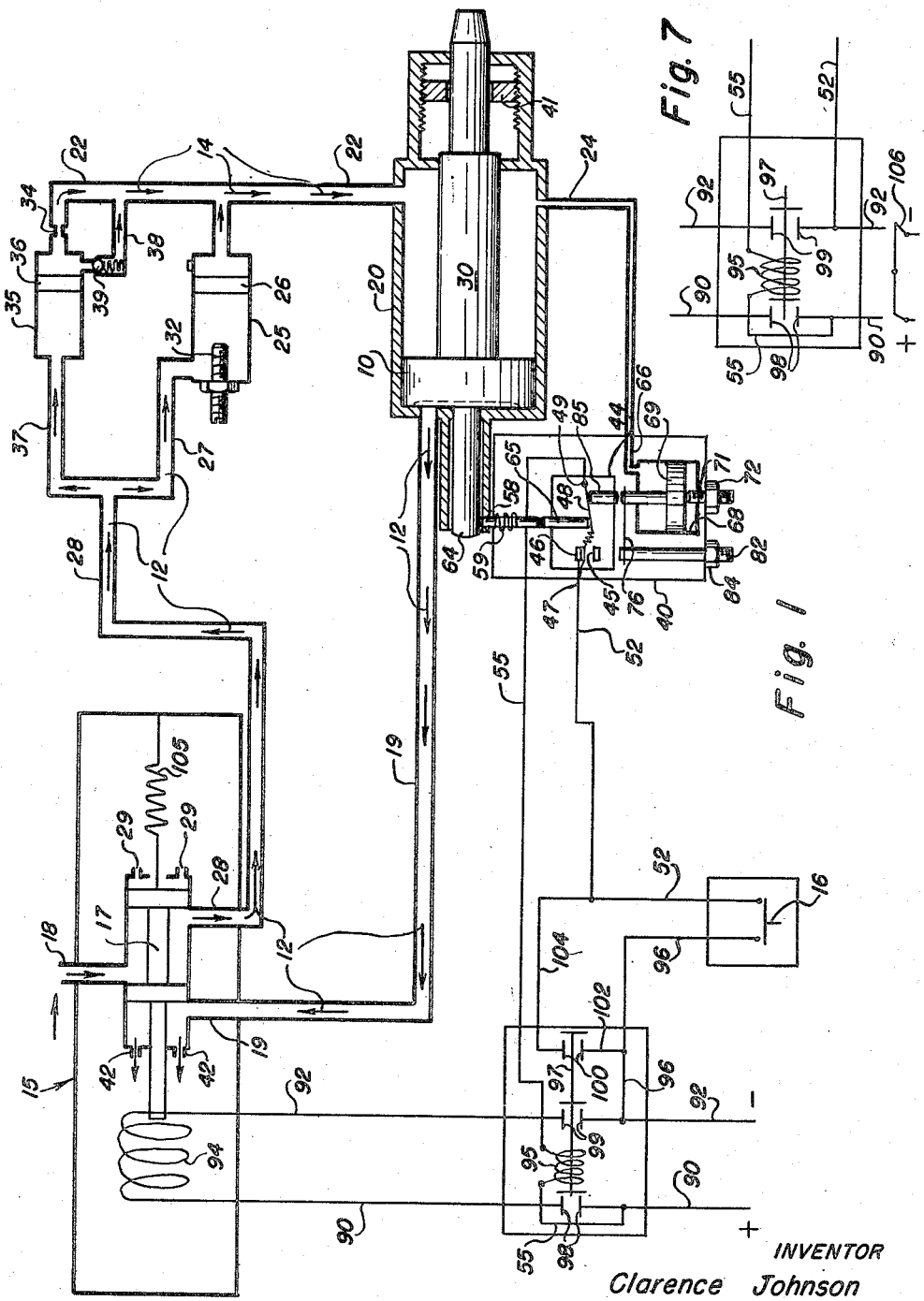
Fig. 1 is a schematic diagram of a hydro-pneumatic power feed system showing the switch mechanism and control circuit.
Figure 2:
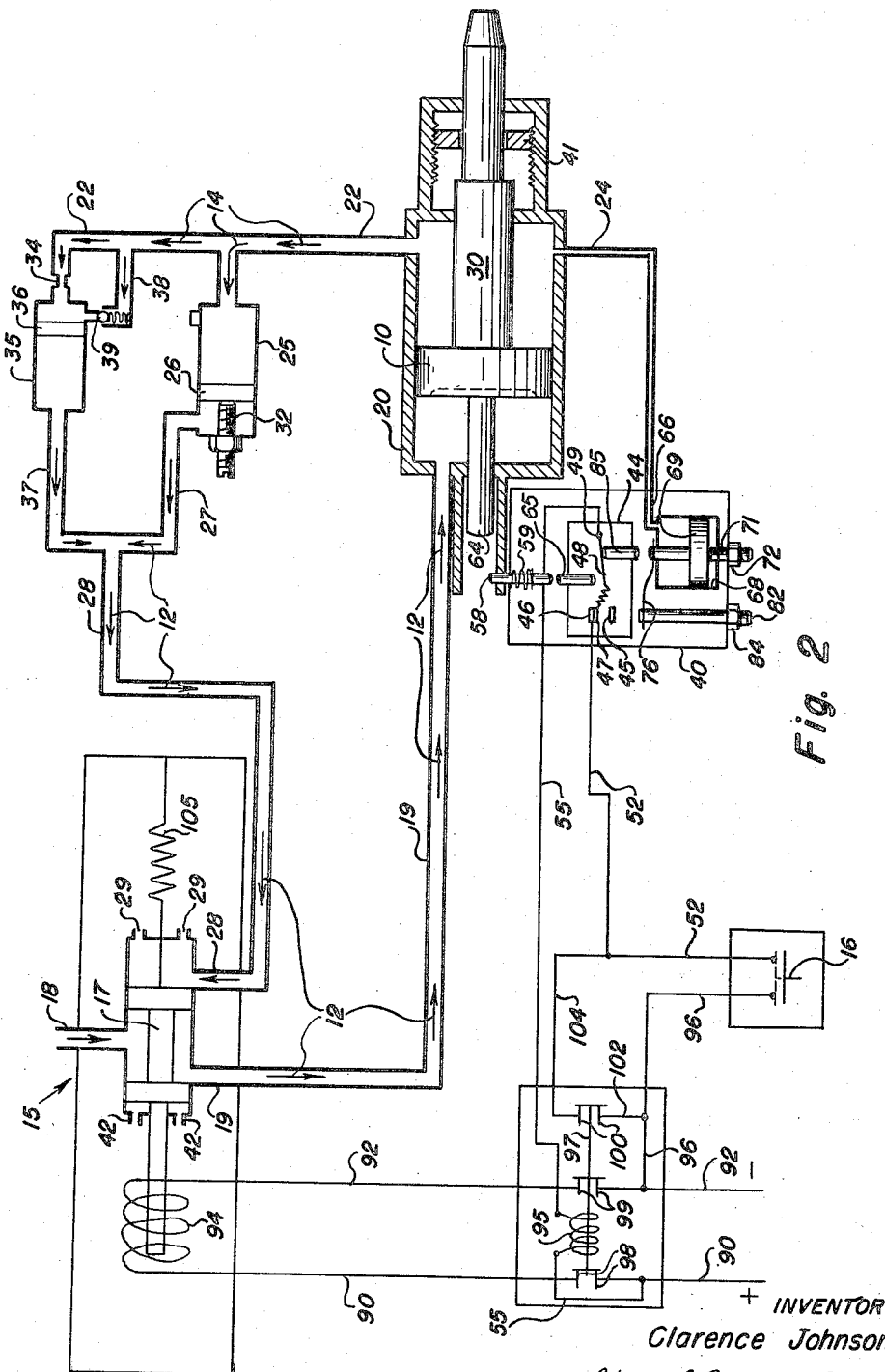
Figs. 2 and 3 are schematic diagrams similar to Fig. 1 illustrating the end of rapid approach and start of controlled feed rate, and start of a retract stroke, respectively.
Figure 3:
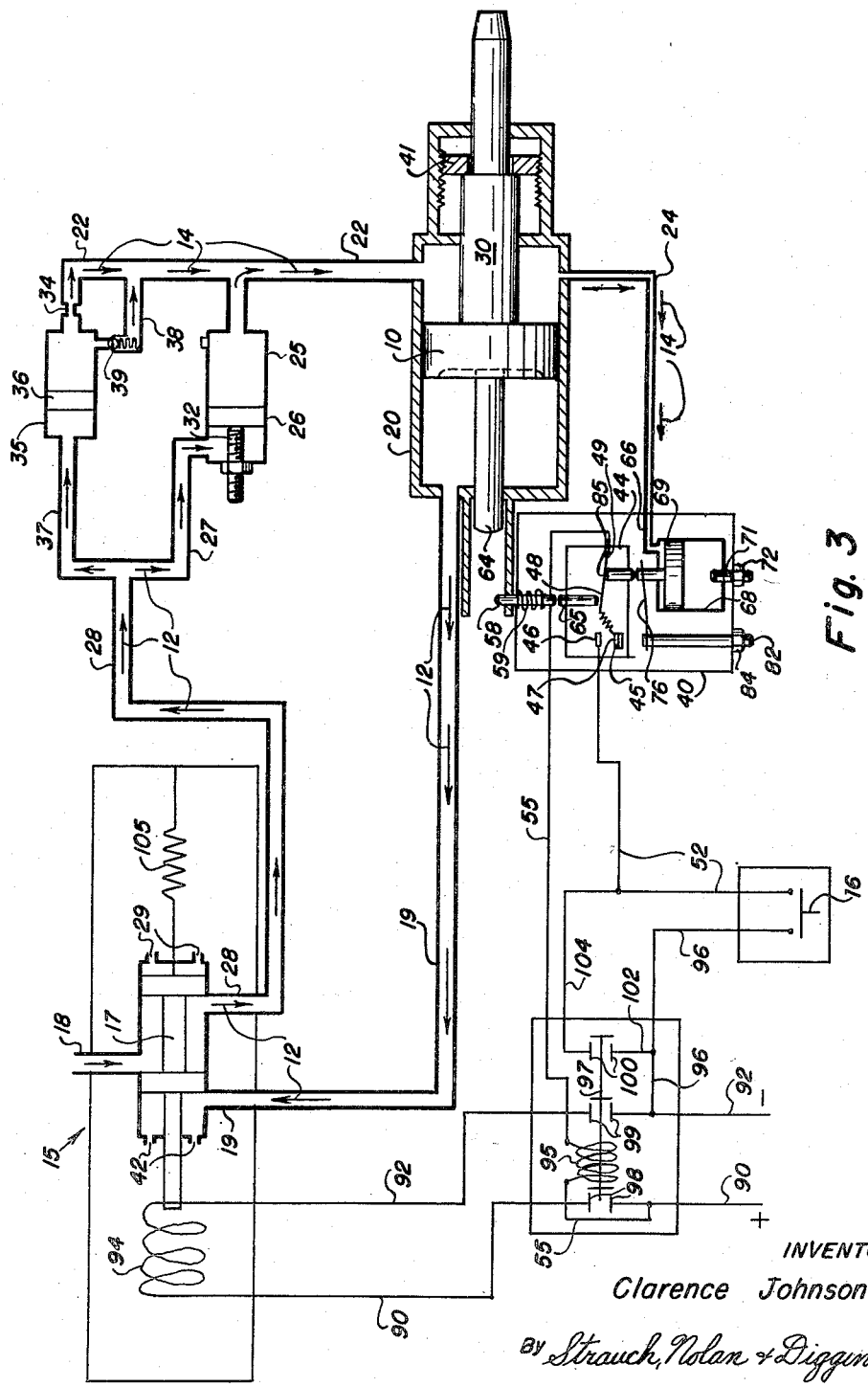

Having reference to Figs. 1, 2 and 3 of the drawings, a detailed discussion of the operation of the hydro-pneumatic power feed mechanism shown may be had from my co-pending application, S. N. 133,922. However, in order to understand fully the function and operation of the switch a brief description of this power feed mechanism follows.

Fig. 1 illustrates the power feed system with working piston 10 in its starting or fully retracted position. As viewed in Figs. 1, 2 and 3 piston 10 is acted upon by compressed air on its left side and by oil on its right side. Arrows showing the direction of flow of the air are indicated at 12, while arrows showing the direction of flow of the oil are indicated at 14. The direction of flow of the air is controlled by the 4-way solenoid operated air valve generally indicated at 15. The arrows 12 and 14 of Fig. 1 indicate that on completion of a retract stroke following a power stroke the oil acting on the right side of piston 10 has pushed the piston to its fully retracted starting position and that the cycle will be repeated as soon as starting button 16, normally open, is manually or automatically operated. As soon as start button 16 is operated piston valve 17 in air valve 15 will move to the position shown in Fig. 2, by means to be more fully explained hereinafter, and a new cycle will be started.

Referring now to Fig. 2 it will be seen that compressed air entering air valve 15 through the air supply intake 18 will be directed by piston valve 17 through passage 19 to the left side of piston 10 forcing it to the right in a power stroke. Movement of piston 10 to the right forces oil in the right side of the working cylinder 20 to escape through passages 22 and 24. The major portion of the oil passes through passage 22 entering rapid approach cylinder 25 where it acts on piston 26 forcing it to the left which causes air in the left side of cylinder 25 to exhaust through passages 27, 28 and air valve exhaust vents 29.

As is fully explained in my co-pending application, S. N. 133,922, the rapid approach cylinder is provided to allow for rapid approach of the quill or tool 30 to the work piece. Mounted in cylinder 25 is an adjustable stop 32 adjusted to arrest the leftward movement of piston 26 just as the tool 30 starts to contact the work piece. At this point, the oil being unable to force piston 26 farther to the left must pass through an adjustable metering orifice 34 into the feed cylinder 35 forcing piston 36 to the left. Movement of piston 36 to the left causes air in the left side of cylinder 35 to exhaust through passages 37, 28, and air valve exhaust ports 29. Also connecting passage 22 with cylinder 35 is a passage 38 provided with a one-way check valve 39 so that oil from passage 22 cannot enter cylinder 35 on a power stroke of piston 10 but must enter through metering orifice 34 alone. This means that after the initial rapid approach of the tool to the work piece further advance of the tool into the workpiece is controlled and slower, the desired speed being determined by the adjustment of metering orifice 34. Fig. 2 illustrates the positions of pistons 10, 26 and 36 at the end of the rapid approach and start of the controlled feed rate.

As piston 10 is pushed by the air to the right during a power stroke or at any other time when air pressure is applied to either the power piston 10 or the control pistons 26 and 36, a portion of the oil in the right side of cylinder 20 will be forced through passage 24 into the switch mechanism generally indicated at 40. Piston 10 continues to the right until quill 30 strikes the adjustable stop 41 as shown in Fig. 3, which illustrates the system immediately after the initiation of a retract stroke. After striking stop 41 the quill "dwells" or takes approximately 12 revolutions while the oil pressure drops due to the continued bleed of oil through passage 34 and causes the switch in switch mechanism 40 to be tripped in a manner to be explained fully hereinafter. The tripping of the switch in turn causes piston valve 17 in air valve 15 to assume the position shown in Figs. 1 and 3.

Referring to Fig. 3 it will be observed that the air will now be directed from air supply intake 18 through passages 28, 27 and 37 into the left sides of cylinders 25 and 35 causing movement of pistons 26 and 36 to the right. Movement of piston 26 to the right forces oil in the right side of cylinder 25 through passage 22 and into the right side of working cylinder 20. Movement of piston 36 to the right forces most of the oil in the right side of the cylinder 35 through one-way check valve 39, passages 38 and 22 into the right side of cylinder 20. A small amount of oil will also be forced through metered orifice 34 but since most of the oil passes through passage 38 the desired rapid retraction of the piston 10 and quill or tool 30 is obtained as is explained in detail in my co-pending application Serial No. 133,922.

The oil pressure on the right side of piston 10 causes the piston to move to the left retracting the tool 30 and forcing air in the left side of cylinder 20 to exhaust through passage 19 and air valve exhaust ports 42. At the end of the retracting stroke piston 10 is in its fully retracted or starting position shown in Fig. 1 and the power feed mechanism is ready to be recycled.

Mounted within switch mechanism 40, Figs. 1–5, is a snap switch 44 of any suitable type such as those shown in U. S. Patent No. 2,260,964 to Wilms and U. S. Patent No. 2,304,400 to Eaton. Snap switch 44 has fixed contacts 45 and 46 and a movable contact 47 secured to a spring toggle arm 48 which is fastened to one side of switch 44 at 49. Contact 46 is connected by means of the screw 56, Fig. 4, to lead wire 52 of the control circuit and contact 47 is connected through arm 48 and screw 54 to lead wire 55 of the control circuit. Contact 45 is shown as a stop only, although it may be used to perform some operating function in the system if desired. When the contacts are in the position shown in Figs. 1, 2 and 4 the circuit through the switch is closed, and when the contacts are in the position shown in Fig. 3 the circuit through the switch is open.

Figure 4:
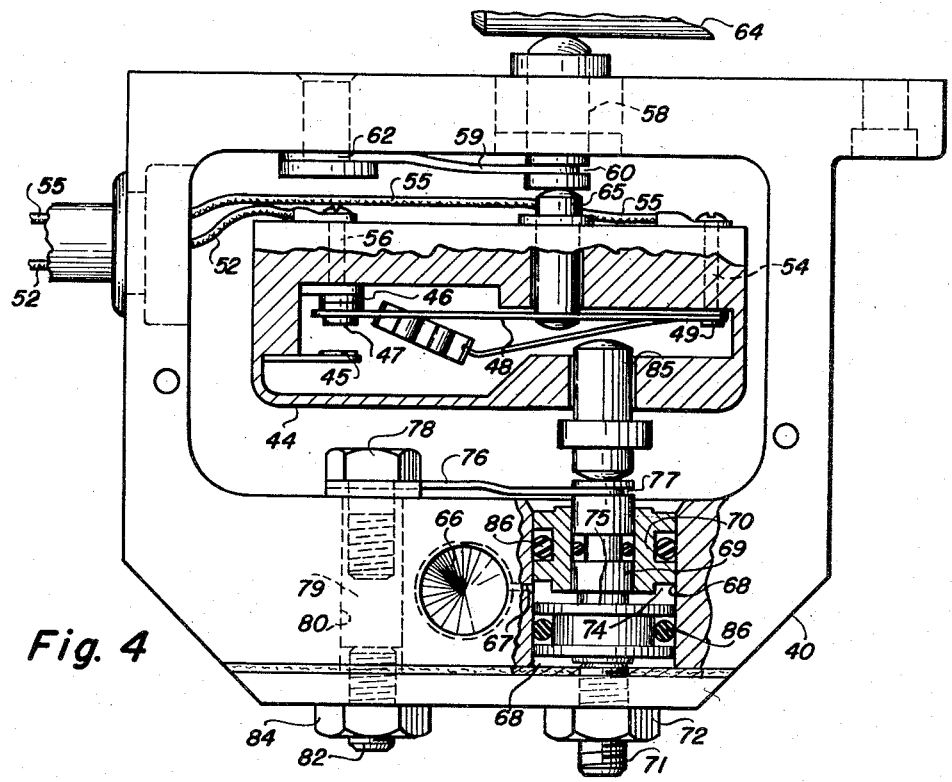
Fig. 4 is a top view of a switch mechanism with parts broken away to show its operation.
Figure 5:
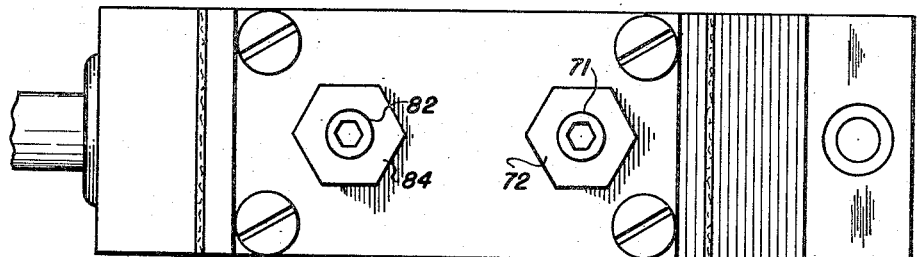
Fig. 5 is a side elevation of a switch mechanism.

A reset button 58 is mounted with a loose fit in a bore at one side of the switch mechanism 40. Reset button 58 is held in position by a spring 59 formed at one end with a yoke which fits into an annular groove 60 in the reset button 58. Spring 59 is secured at its other end to the side wall of switch mechanism 40 at 62. The spring 59 tends to force the button 58 outwardly of the switch so that in its normal position the top of the button will be in the path of the rearward extension 64 of piston 10 as shown in Figs. 2 and 3. When piston 10 is in its starting or fully retracted position the extension 64 pushes reset button 58 into the switch against the action of its spring 59 as shown in Figs. 1 and 4. When button 58 is thus forced inwardly it pushes on switch button 65 mounted loosely within a bore in switch 44 causing contacts 46 and 47 to close as shown in Figs. 1 and 4. As soon as the switch is closed the power feed mechanism is ready to recycle whenever the start button 16 is closed manually or automatically, and when the recycling starts, piston 10 and extension 64 will be advanced during the power stroke, as explained hereinbefore, allowing button 58 to be again raised by the action of spring 59 into the path of extension 64. It should be noted here, however, that even though button 58 has been returned by its spring to its normal outward position, contact arm 48 will remain in the position into which it has been pushed keeping the switch closed as is best illustrated in Fig. 2. The switch will remain closed until it is positively pushed into its open position.

When air pressure is applied either to piston 10 or control pistons 26 and 36 oil is forced through passage 24 into switch mechanism 40 as explained hereinbefore. The oil enters switch mechanism 40 through a tapped hole 66, as is best shown in Fig. 4, into which the passage or conduit 24 is threaded. At the bottom of hole 66 there is a small passage 67 leading into a bore or cylinder 68 in the side of switch mechanism 40. A spring biased piston assembly 69 and a gland 70 are fitted into the cylinder 68 as shown in Fig. 4. At the outer end of piston 69 there is an adjustable piston stop screw 71 which is locked in position by means of lock nut 72 when the proper adjustment is obtained. The oil entering cylinder 68 through passage 67 passes into an annular groove 74 in the cylinder 68 formed by gland 70 where, as the oil pressure is built up at the beginning of the power stroke, it will press against the shoulder 75 of the piston forcing it outwardly of switch mechanism 40. Piston 69 is normally urged inwardly by means of piston tension spring 76 which is provided at one end with a yoke which fits into an annular groove 77 in piston 69. The other end of spring 76 is secured by some means such as a cap screw 78 to cylindrical piece 79 slidably fitted into a bore 80 in the side wall of switch mechanism 40. At its outer end, piece 79 abuts the adjustable spring tension screw 82 which is locked in position by means of lock nut 84. The position of screw 82 is important since it is this adjustment which controls the point at which oil pressure acting on the piston must drop before the switch is reversed. This reverses the air valve 15 as will be more fully explained hereinafter, and causes working piston 10 to be returned to the starting position. If the tension in the piston spring 76 is not great enough the quill or tool 30 may "dwell" too long or stop completely at the end of the power stroke. If the tension in piston spring 76 is too great, the unit will oscillate rapidly without completing a full power stroke.

In the absence of pressure in the hydraulic circuit, piston assembly 69 is held inwardly by its tension spring 76 as shown in Fig. 1. However, when the oil is forced into the switch mechanism 40, for example, during the power stroke pressure will be built up which forces piston 69 outwardly against the action of its tension spring 76, as shown in Fig. 2, until it strikes against its stop 71. In actual practice the movement of piston 69 is very small as may be seen from the small amount of clearance between the top of the piston and the gland 70 in Fig. 4. When the oil pressure starts to drop at the end of the power stroke, as explained hereinbefore, tension spring 76 overcomes the pressure of the oil and causes piston 69 to surge inwardly and strike switch button 85; button 85 in turn strikes spring arm 48 causing it to reverse its position which opens contacts 46 and 47, Fig. 3, so that the circuit through switch 44 is open. It is to be understood that since this takes place at the end of the power stroke when extension 64 is not holding reset button 58, the button 58 and switch button 65 will offer no resistance to the force exerted by button 85 against spring arm 48.

The gland 70 mounted in the upper part of cylinder 68 is pressed into the bore of cylinder 68 and is necessary in order to properly prepare the bore for the piston since the bore is shallow, and in order to have accurate piston action the diameter must be very true and highly polished to avoid excessive wear on the O-rings 86. The O-rings 86 are conventional and prevent oil leakage along the sides of cylinder 68.

With reference to Figs. 1, 2 and 3, current enters the control circuit through power lines 90 and 92 which lead to the air valve solenoid coil 94. The lead wire 55 connects line 90 and movable contact 47 in the switch mechanism 40, see also Fig. 4, and has in series with it relay coil 95. Lead 96 connects line 92 with one side of start button 16; the other side of start button 16 is connected by lead wire 52 to fixed contact 46 in switch mechanism 40 so that when the start button 16 is depressed and the switch 44 in switch mechanism 40 is closed, Figs. 1, 2 and 4, a circuit will be completed through line 90, lead 55, switch 44, lead 52, start button 16, lead 96, and line 92. When this circuit is completed relay coil 95 will be energized and its armature 97 will close contacts 98 in line 90, contacts 99 in line 92 and contacts 100 in a holding circuit. The holding circuit comprises lead wire 102, connected to lead 96 and lead wire 104 connected to lead 52, and is provided so that after start button 16 is released a circuit will be maintained through line 90, lead 55, relay 95, lead 55, switch 44, lead 52, lead 104, contacts 100, lead 102, lead 96, and line 92. This circuit will remain closed until switch 44 is opened.

When the contacts 98 and 99 in lines 90 and 92, respectively, are closed by relay armature 97 the air valve solenoid coil 94 is energized and piston valve 17 is pulled to the left against the action of its spring 105 and takes the position shown in Fig. 2.

Referring now to Fig. 1 wherein the system is shown with piston 10 in its fully retracted starting position it will be seen that switch 44 is closed since rearward extension 64 has depressed reset button 58, as explained hereinbefore. With piston 10 in this position the cycle is started by pushing start button 16 which completes the circuit through relay 95 which in turn causes solenoid coil 94 to be energized, and coil 94 pulls piston valve 17 to the left against the action of its spring 105. Piston valve 17 is then in the Fig. 2 position causing the air to push piston 10 to the right in a power stroke as explained above, forcing oil into the switch mechanism 40, and at the end of the stroke the oil pressure drops sufficiently to allow piston 69 to spring up and open switch 44. The exact point at the end of the power stroke where this will take place is dependent upon the adjustment of piston tension spring 76 as explained above. When the circuit through switch 44 is opened relay 95 is deenergized and this in turn deenergizes solenoid coil 94 allowing piston valve 17 to be moved to the right by the action of its spring 105. Piston valve 17 will then be in the position shown in Fig. 3 and the oil acting on the right side of piston 10 will cause it to retract to its Fig. 1 or starting position. When piston 10 has completed its travel to the left depression of reset button 58 by extension 64 will again close switch 44 allowing a new cycle to be started whenever start button 16 is again depressed. Thus it will be understood that recycling cannot take place until the piston 10 is fully retracted to its starting position where extension 64 can act on reset button 58 to close switch 44.

Figure 6:
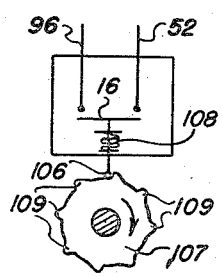
Fig. 6 is a schematic diagram illustrating a modified starting button arrangement for automatic recycling.

As shown in Fig. 6 start button 16 may be operated automatically as well as manually. In the embodiment shown button 16 is provided with a roller 106 which follows a cam wheel such as 107. A spring 108 tends to hold button 16 in its open position and hold the roller 106 against the periphery of cam wheel 107. Appropriately spaced rises 109 on cam wheel 107 cause start button to periodically open and close as wheel 107 rotates in the direction shown by the arrow. Cam wheel 107 may be mounted in any suitable manner on whatever assembly may require automatic recycling. For instance, if the hydropneumatic mechanism is to be used on a hopper fed, dial feed arrangement the cam wheel 107 can be mounted below and geared to the dial so that the rises 109 on wheel 107 will cause the button 16 to close each time the dial carries a work piece to an operating station.

A further modification is shown in Fig. 7 which illustrates a portion of the control arranged so that the power feed mechanism may be controlled automatically solely in response to the return of working piston to its fully retracted or starting position. In this arrangement the start button 16, contacts 100 of the holding circuit, and lead wires 96, 102 and 104 have been eliminated from the circuit. Lead wire 52 which is connected at its one end to contact 46 in snap switch 44, as shown in Fig. 1, is now connected directly with power line 92 at its other end as shown in Fig. 7. In other respects the modified arrangement is like the arrangement shown in Fig. 1 with lead 55 connected to movable contact 47 in switch 44, and lines 90 and 92 carrying power from the power supply to the solenoid coil 94.

With piston 10 in its fully retracted starting position, Fig. 1, the switch 44 is closed, as explained hereinbefore, and current will pass through line 90, lead 55, relay 95, lead 55, switch 44, lead 52 and line 92 to complete the circuit and energize relay 95. Energizing relay 95 causes contacts 98 and 99 to be closed so that current from the power supply energizes solenoid coil 94 causing valve 17 to shift so that piston 10 is started on a power stroke. At the end of a power stroke piston 69 causes switch 44 to be opened, as explained hereinbefore, thereby deenergizing relay 95 and solenoid coil 94 so that valve 17 is again shifted causing piston 10 to return to its starting position where it will close switch 44 starting a new cycle. To start and stop the operation of the power feed in this arrangement a line switch 106 of any suitable design is provided across lines 90 and 92 from the power supply.

The switch mechanism is an important link in automatic operation when a number of drill units, which is usually the case, are used on one machine. The units are usually elements of a machine rather than a machine in themselves, and the controls are one of the features that make it easy to integrate them into the one machine. One solenoid valve will usually serve all the units and, in that case, the switches are connected in parallel and the solenoid valve will not reverse until the last unit has completed its work. If this function fails some holes may not be drilled deep enough before the units retract. On the return stroke the units must sometimes be interlocked with the indexing mechanism, clamps, fixtures or work feeders to prevent them from operating until the units are fully retracted. If the index table starts before the drills are retracted they will be broken. The last unit to completely retract starts the index table and when the index table is completely in position it starts all the units again. This cycle will continue until stopped by hand or breakdown.

It will be understood from the foregoing description that there is provided a novel switch mechanism and control circuit for use in hydropneumatic mechanisms which switch is actuated in one direction by positive mechanical action and in the other direction under control of oil pressure. The switch mechanism and control circuit may be manually or automatically recycled allowing them to be used in a variety of installations, and provide positive and accurate recycling action for the power feed mechanisms. In addition, the provision of a positive mechanical resetting action results in increased production and longer tool life over the switch mechanisms of the prior art.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power mechanism comprising a power member movable through an advance and retract stroke under the control of a closed hydraulic circuit, the pressure in said circuit dropping when said advance stroke is interrupted, a valve selectively operable to supply fluid to said mechanism to advance and retract said power member, an electrical control circuit including a solenoid for actuating said valve, a starting switch in said circuit adapted, when closed, to energize said control circuit and said solenoid to shift said valve and supply fluid to advance said power member, switch mechanism in said control circuit, means responsive to a predetermined drop in the pressure in said hydraulic control circuit for actuating said switch mechanism to deenergize said electrical control circuit whereby said valve is shifted to supply fluid to retract said power member, and additional mechanism responsive to the movement of said power member to its retracted position to reset said switch mechanism to its initial position whereby another cycle may be initiated by closing said start switch.

2. The control circuit according to claim 1 together with means for automatically periodically closing said starting switch whereby a number of complete cycles may be periodically automatically initiated.

3. A power mechanism comprising a power member movable through an advance and retract stroke under the control of a closed hydraulic circuit, the pressure in said circuit dropping when said advance stroke is interrupted, a valve selectively operable to supply fluid to said mechanism to advance and retract said power member, an electrical control circuit including a solenoid for actuating said valve, a normally open start switch adapted to be selectively closed to energize the control circuit and said solenoid to shift said valve and initiate the advance stroke of said power member; a holding circuit to maintain the control circuit energized after said start switch has been released; a double contact switch mechanism; means responsive to a predetermined pressure drop in said hydraulic circuit to actuate said double contact switch mechanism and open said holding circuit to deenergize the control circuit and said solenoid and thereby shift said valve to cause the power member to return to its starting position; and additional means to reset the control circuit whereby the power member may be recycled when the start element is again engaged.

4. A power mechanism comprising a power member movable through an advance and a retract stroke under the control of a closed hydraulic circuit, the pressure in said circuit dropping when said advance stroke is interrupted, a valve selectively operable to supply fluid to said mechanism to advance and retract said power member, a control circuit including a solenoid for actuating said valve, a normally open start switch adapted to be selectively engaged to energize the control circuit and said solenoid to shift said valve to advance said power member; a holding circuit to maintain the control circuit energized after said start element has been released; a switch mechanism in said control circuit; hydraulic means responsive to a predetermined drop in pressure in said hydraulic circuit operable to actuate said switch mechanism to open said holding circuit and thereby open said control circuit whereby said valve is shifted to cause the power member to retract, and means operable when said power member is fully retracted to close said switch mechanism thereby placing said control circuit in its initial condition whereby the power member may be recycled when the start switch is again engaged.

5. In a hydropneumatic power system, a power piston movable through an advance and retract stroke under the control of fluid flow in a closed hydraulic circuit, the pressure in said closed circuit dropping at the end of an advance stroke of said power piston, feed control pistons in said closed circuit, valve means for selectively applying fluid pressure to said power piston or said control pistons, respectively, to advance or retract said power piston; an electrical control circuit including a solenoid for operating said valve means, a starting element adapted when closed to energize said control circuit and said solenoid to operate said valve to apply pressure to advance said power piston, a double contact switch in said circuit, a hydraulic actuator for said switch connected to said hydraulic circuit and adapted to be operated by a preselected pressure drop therein to actuate said switch to open one contact and deenergize said circuit whereby said solenoid operated valve will be deenergized and apply pneumatic pressure to said feed control pistons to retract said power piston, and mechanical means for actuating said switch mechanism at the completion of the retract stroke of said power piston to close said one contact thereby restoring the electrical control circuit to its initial condition whereby the power piston may be recycled by closing said start element.

6. An electrical control circuit including a solenoid valve operator comprising, a normally open starting switch adapted to be selectively closed to energize the control circuit and said solenoid valve operator; a holding circuit to maintain the control circuit energized after said starting switch is opened; a dual switch mechanism in said holding circuit; pressure responsive means operable to actuate said dual switch mechanism upon a drop in pressure below a predetermined minimum to open said holding circuit to deenergize said solenoid valve operator; and mechanical means to close said dual switch mechanism after deenergization of said solenoid valve operator and close the holding circuit thereby placing said control circuit in its initial condition for a repeat operation.

7. A power mechanism comprising a power member movable through an advance and retract stroke under the control of the resistance flow of a fluid in a closed hydraulic circuit, the pressure in said hydraulic circuit dropping when said advance stroke is interrupted; a valve selectively operable to supply fluid to said mechanism to advance and retract said power member; an electrical control circuit, including a solenoid for actuating said valve, adapted to be connected to a source of electrical energy and, when energized, to energize said solenoid to shift said valve and supply fluid to advance said power member; a switch in said electrical control circuit; means responsive to a predetermined drop in the pressure in said hydraulic circuit for actuating said switch in one direction to deenergize said solenoid whereby said valve is shifted to supply fluid to retract said power member; and additional means responsive to the movement of said power member to its retracted position to actuate said switch in the opposite direction to reset said switch to its initial position.

8. A power mechanism comprising a power member movable through an advance and retract stroke under the control of the resistance flow of a fluid in a closed hydraulic circuit, the pressure in said hydraulic circuit dropping when said advance stroke is interrupted; a valve selectively operable to supply fluid to said mechanism to advance and retract said power member; an electrical control circuit, including a solenoid for actuating said valve, adapted to be connected to a source of electrical energy and, when energized, to energize said solenoid to shift said valve to advance said power member; a holding circuit to maintain the solenoid energized during the advance stroke of said power member; a switch in said electrical control circuit; hydraulic means responsive to a predetermined drop in pressure in said hydraulic circuit operable to actuate said switch in one direction to open said holding circuit and thereby deenergize said solenoid whereby said valve is shifted to retract said power member; and means operable when said power member is fully retracted to actuate said switch in the opposite direction to reset said switch to its initial position.

References Cited in the file of this patent

UNITED STATES PATENTS

| Number | Name | Date |
| --- | --- | --- |
| 1,724,635 | Bath | Aug. 13, 1929 |
| 1,743,782 | Kershaw | Jan. 14, 1930 |
| 1,927,583 | Ernst | Sept. 19, 1933 |
| 2,169,470 | Miller et al. | Aug. 15, 1939 |
| 2,219,896 | Harrington et al. | Oct. 29, 1940 |
| 2,252,939 | McCoy | Aug. 19, 1941 |
| 2,418,508 | Goepfrich | Apr. 8, 1947 |
| 2,448,557 | Stephens | Sept. 7, 1948 |
| 2,507,065 | Trautman | May 9, 1950 |
| 2,574,096 | Fischer et al. | Nov. 6, 1951 |